US007754159B2

(12) United States Patent
Frisch (10) Patent No.: US 7,754,159 B2
(45) Date of Patent: Jul. 13, 2010

(54) SYSTEM AND METHOD FOR LIMITING BACKFLOW IN A BIOLOGICAL FLUIDIZED BED REACTOR

(75) Inventor: Samuel Frisch, Manalapan, NJ (US)

(73) Assignee: Envirogen Technologies, Inc., Ewing, NJ (US)

( * ) Notice: Subject to any disclaimer, the term of this patent is extended or adjusted under 35 U.S.C. 154(b) by 437 days.

(21) Appl. No.: 11/823,206

(22) Filed: Jun. 27, 2007

(65) Prior Publication Data

US 2009/0004068 A1 Jan. 1, 2009

(51) Int. Cl.
*B01J 8/18* (2006.01)
*B01D 24/40* (2006.01)
*B01J 8/08* (2006.01)
*F27B 15/08* (2006.01)
*B01D 33/70* (2006.01)
*C02F 3/00* (2006.01)

(52) U.S. Cl. ............ 422/140; 422/139; 422/143; 422/144; 422/232; 210/150; 210/268; 210/618; 210/807

(58) Field of Classification Search ............ 422/140, 422/139, 232, 143, 144; 210/150, 268, 618, 210/629, 807
See application file for complete search history.

(56) References Cited

U.S. PATENT DOCUMENTS

| 3,846,289 | A | | 11/1974 | Jeris et al. | |
|---|---|---|---|---|---|
| 3,850,190 | A | * | 11/1974 | Carlson | 137/218 |
| 4,304,857 | A | | 12/1981 | Brouillard et al. | |
| 4,464,262 | A | * | 8/1984 | Owens et al. | 210/291 |
| 4,469,599 | A | * | 9/1984 | Gros et al. | 210/610 |
| 4,568,458 | A | * | 2/1986 | Maclean | 210/197 |
| 4,931,388 | A | * | 6/1990 | Katinger | 435/41 |
| 5,372,712 | A | * | 12/1994 | Petit | 210/151 |
| 5,552,052 | A | * | 9/1996 | Mazewski et al. | 210/617 |
| 5,584,996 | A | * | 12/1996 | Petit | 210/274 |
| 5,766,491 | A | | 6/1998 | Mazewski et al. | |
| 5,788,842 | A | | 8/1998 | Frisch | |
| 6,592,751 | B2 | * | 7/2003 | Haridas | 210/97 |
| 6,706,521 | B2 | | 3/2004 | Frisch | |
| 2005/0287659 | A1 | | 12/2005 | Frisch et al. | |

FOREIGN PATENT DOCUMENTS

EP 0145612 A 6/1985
WO WO 87/05322 9/1987

OTHER PUBLICATIONS

International Search Report dated Nov. 6, 2008, application No. PCT/US2008/068354.

* cited by examiner

*Primary Examiner*—Walter D Griffin
*Assistant Examiner*—Huy-Tram Nguyen
(74) *Attorney, Agent, or Firm*—RatnerPrestia (57) ABSTRACT

A fluidized bed reactor configured for reduced backflow of fluid is provided. The fluidized bed reactor comprises a vessel configured to contain a level of fluid, a feed conduit positioned to deliver feed into the vessel from an elevation above the level of fluid and a vacuum relief valve coupled to said feed conduit to introduce gas into the feed conduit.

31 Claims, 6 Drawing Sheets

SYSTEM AND METHOD FOR LIMITING BACKFLOW IN A BIOLOGICAL FLUIDIZED BED REACTOR

FIELD OF THE INVENTION

The present invention relates to a biological fluidized bed reactor, and more specifically, a system and a method for limiting backflow in the biological fluidized bed reactor.

BACKGROUND OF THE INVENTION

Biological fluidized bed reactors are commonly employed in waste treatment plants to treat wastewater or any other contaminated matter. The contaminated matter, called the influent, is typically distributed through an inlet conduit and into a tank or vessel of the biological fluidized bed reactor. For example, a flow distributor may be coupled to the inlet conduit and positioned at the bottom of the reactor vessel to deliver the influent to the vessel. Such a flow distributor typically includes a plurality of nozzles configured to inject the influent into the reactor vessel.

The reactor vessel often contains media particles, such as sand, activated charcoal or synthetic beads. The media particles are covered with a biologically active material capable of consuming the contaminants of the influent through enzymatic reaction. More specifically, the biologically active material reduces the biochemical oxygen demand of the influent. It is the activity of the biologically active material (or "biomass") within the biological reactor that degrades contaminants in the influent to effect a filtration process. The treated matter, called the effluent, buoys above the strata of media particles to the top of the vessel. The effluent is removed from the reactor vessel by mechanical means for further treatment or disposal. The principles of operation of a biological fluidized bed reactor are disclosed in U.S. Pat. No. 3,846,289, which is incorporated herein by reference in its entirety.

Under normal operating conditions of the fluidized bed reactor, a pump or other delivery apparatus typically distributes the influent through the inlet conduit and into the bottom portion of the reactor vessel. The influent flows upwardly through the media particles at a velocity sufficient to buoy the media particles. The flow rate of the influent through the nozzles is sufficient to fluidize the media particles, i.e., induce fluid-like movement of the media particles and suspend the fluidized media particles throughout the interior of the vessel.

In the event of a power loss or interruption, the pump or other delivery apparatus ceases to deliver influent into the reactor vessel. Consequent to the influent flow interruption, the influent and media particles within the fluidized bed reactor may backflow through the nozzles of the flow distributor and into the inlet conduit. Examples of variables that can influence the backflow in the reactor vessel in the event of a power interruption include, but are not limited to, the weight and volume of media particles, position of the inlet conduit relative to the reactor vessel fluid level, elevation of the influent source relative to the elevation of the reactor vessel and existence of gas pockets in the inlet conduit.

Regardless of the origin or cause of the backflow condition, the backflow of media particles can obstruct and clog the nozzles of the flow distributor. Upon reactivation of the pump or other delivery apparatus, the motive influent circumvents the obstructed nozzles and surges through the remaining unobstructed nozzles at a higher velocity. The undesirable arrangement of obstructed and unobstructed nozzles causes a non-uniform flow distribution throughout the reactor vessel. Non-uniform flow distribution attributes to a host of problems, including but not limited to, nozzle abrasion resulting from the high velocity influent, defluidized media particle clusters adjacent the obstructed nozzles, increased influent filtration cycle time and more.

The entire flow distributor is typically removed from the reactor vessel or disassembled within the reactor vessel for repair or replacement to eliminate the media particle obstruction from the nozzles. Servicing the flow distributor is a costly operation accounting for reactor downtime, parts and labor. Therefore, it would be beneficial to provide a system configured to limit or prevent backflow in a biological fluidized bed reactor.

Figure 1:
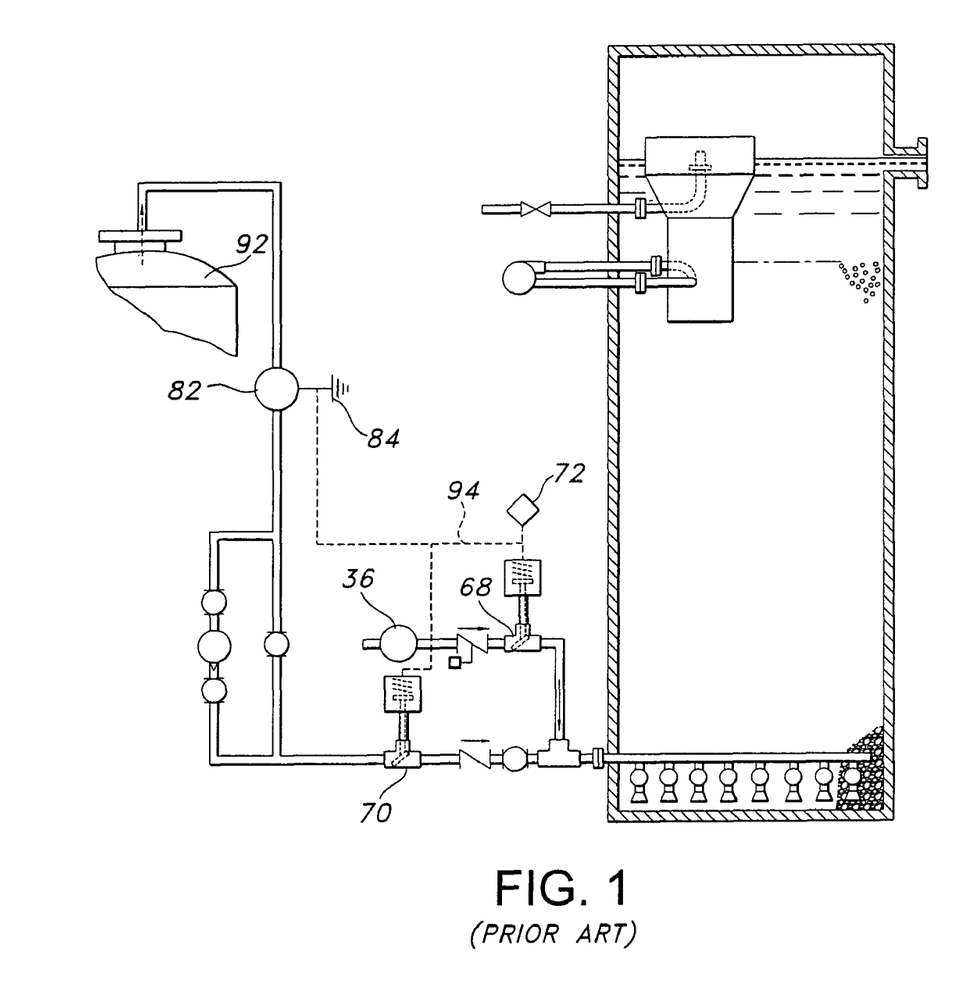
FIG. 1 is a partial cross-sectional side view of a prior art fluidized bed reactor including a backflow prevention system.
Figure 2:
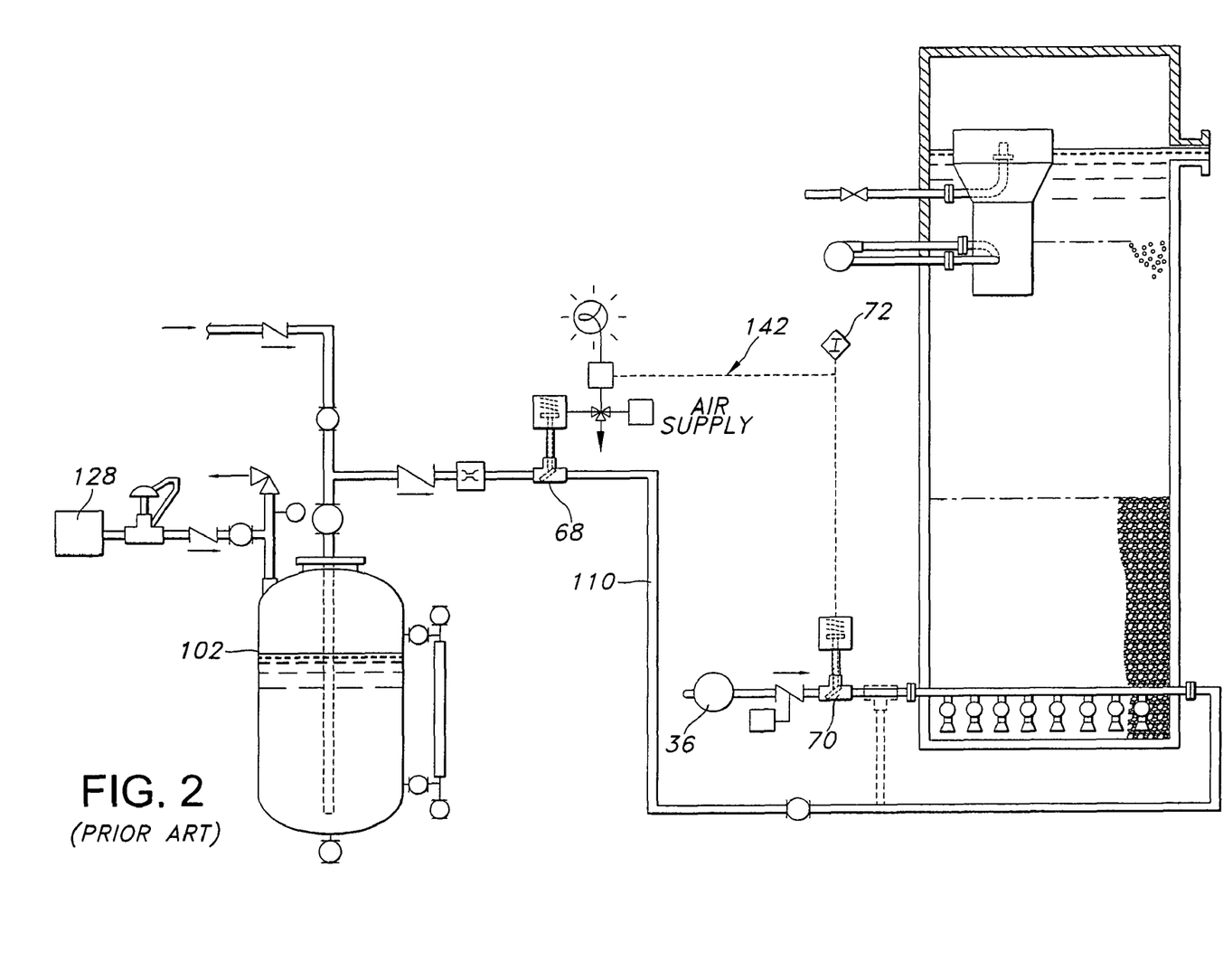
FIG. 2 is a partial cross-sectional side view of another prior art fluidized bed reactor including a backflow prevention system.

Attempts have been made to incorporate a backflow prevention system into a biological fluidized bed reactor. For example, a backflow prevention system for a media bed reactor disclosed by Mazewski et al. in U.S. Pat. No. 5,766,491, which incorporated herein by reference in its entirety, is illustrated in FIGS. 1 and 2. In this example the fluidized bed reactor of Mazewski et al. comprises a pump 36 that delivers influent through a fluid flow conduit and into a flow distributor positioned at the bottom end of a reactor vessel. A backflow prevention apparatus indirectly coupled to the fluid flow conduit is configured to deliver an auxiliary fluid to the flow distributor in the event influent flow to the flow distributor is interrupted. The backflow prevention apparatus illustrated in FIG. 1, which includes an auxiliary tank 92, auxiliary pump 82 and rechargeable battery 84, is coupled to the fluid flow conduit via an auxiliary fluid flow conduit. By maintaining the auxiliary fluid flow to the flow distributor following an influent flow interruption, media bed constituents are limited from backing up into the flow distributor while the media bed settles.

The battery operated auxiliary pump 82 is configured to deliver the auxiliary fluid from the auxiliary tank 92 through the auxiliary fluid flow conduit. The auxiliary fluid flow conduit delivers the auxiliary fluid into the reactor vessel through the flow distributor nozzles. The backflow prevention system additionally includes a shutdown interlock assembly 94 which comprises a solenoid actuated fail-open valve 68 in the auxiliary fluid flow conduit and a solenoid actuated fail-close valve 70 in the primary fluid flow conduit. The fail-open valve 68 and the fail-close valve 70 are electrically interlocked and operate in response to a signal generated by a power loss indicator 72 that detects power loss to a motor used to drive the primary pump 36.

Nevertheless, there continues to be a need to further develop and improve backflow limiting systems for biological fluidized bed reactors.

SUMMARY OF THE INVENTION

According to an aspect of the invention a fluidized bed reactor configured for reduced backflow of fluid is provided. The fluidized bed reactor comprises a vessel configured to contain a level of fluid, a feed conduit positioned to deliver feed into the vessel from an elevation above the level of fluid and a vacuum relief valve coupled to said feed conduit to introduce gas into the feed conduit.

According to another aspect of the invention a fluidized bed reactor for reduced backflow of fluid is provided. The fluidized bed reactor comprises means for containing a level of fluid, means for delivering feed into the containing means from an elevation above the level of fluid and means for reducing vacuum in the feed conduit.

According to yet another aspect of the invention, a method is provided for reducing the backflow of fluid following shutdown of a pump. The method comprises the step of introducing gas into a portion of the feed conduit that is positioned at an elevation above a level of fluid contained in the vessel, thereby reducing vacuum in the feed conduit and reducing backflow of the fluid.

According to still another aspect of the invention a system for reducing the backflow of fluid is provided. The system comprises a feed conduit extending between a pump and a vessel, wherein at least a portion of the feed conduit is positioned at an elevation above a level of fluid in the vessel. A vacuum relief valve is coupled to the feed conduit to introduce gas into the feed conduit. A check valve is coupled to the feed conduit to limit backflow of fluid in the feed conduit. An air release valve is coupled to the feed conduit to exhaust gas from the feed conduit.

According to another aspect of the invention a method is provided for configuring the fluidized bed reactor for reduced backflow of the fluid. The method comprises the step of connecting a feed conduit between the pump and the vessel such that at least a portion of the feed conduit is positioned at an elevation above the level of fluid in the vessel. A vacuum relief valve is coupled to introduce gas into the feed conduit, thereby facilitating the reduction of vacuum in the feed conduit and the associated backflow of the fluid.

BRIEF DESCRIPTION OF THE DRAWINGS

The invention is best understood from the following detailed description when read in connection with the accompanying drawings. Included in the drawings are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The invention is best understood from the following detailed description when read in connection with the accompanying drawing figures, which shows exemplary embodiments of the invention selected for illustrative purposes. The invention will be illustrated with reference to the figures. Such figures are intended to be illustrative rather than limiting and are included herewith to facilitate the explanation of the present invention.

As used herein, the term "biomass" refers to a collective mixture of microorganisms such as bacteria, fungi, protozoans, and other microorganisms.

As used herein, the term "fluidize" refers to a mass of solid particles made to flow like a liquid by injection of a fluid.

As used herein, the term "check valve" refers to a valve that permits gases and/or liquids to flow in only one direction, while limiting or preventing process flow in an opposite direction.

As used herein, the term "air release valve" refers to a valve that expels or permits the release of gasses in a system at or above a specific pressure.

As used herein, the term "vacuum relief valve" refers to a valve that introduces atmospheric air or other gasses into a system when the system is maintained at or below a specific pressure.

Figure 3:
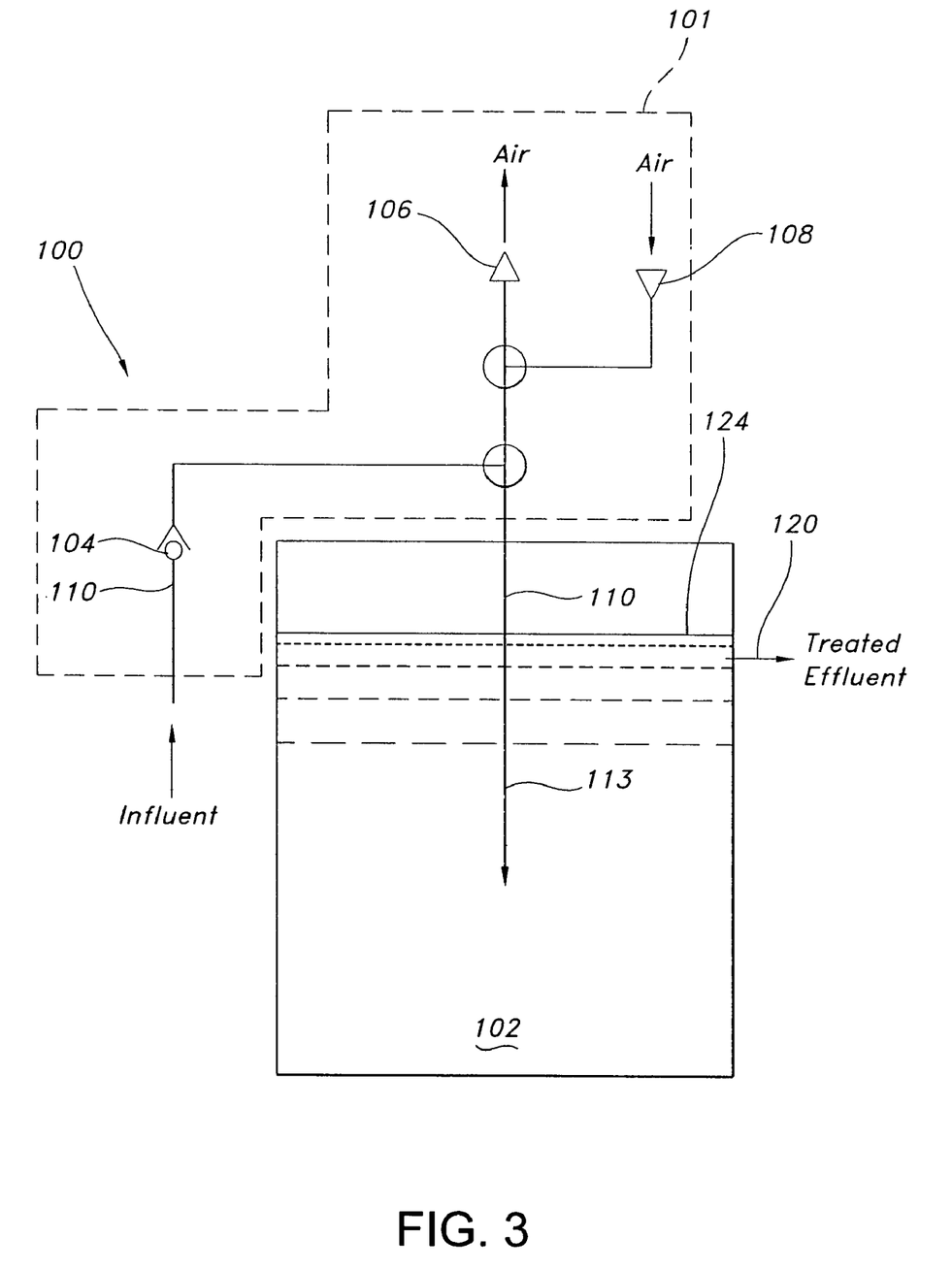
FIG. 3 is a block diagram of an embodiment of a biological fluidized bed reactor backflow limiting system according to an aspect of this invention.

Referring generally to the figures, a biological fluidized bed reactor 100, 200, 300 is used, for example, in a waste water treatment facility to process waste water to remove impurities from the waste water passed therethrough. Exemplary embodiments of biological fluidized bed reactors 100, 200, 300 are represented in a block diagram format in FIG. 3, shown schematically in FIG. 4 and illustrated in structural form in FIG. 5. According to exemplary aspects of this invention, fluidized bed reactor 100, 200, 300 comprises a reactor vessel 102 configured to contain a level of fluid and media particles 103, a feed conduit 110 extending into vessel 102 from an elevation above the level of fluid, and a vacuum relief valve 108 coupled to introduce air into feed conduit 110.

Generally, a fluidization pump 112 is configured to deliver influent through feed conduit 110. At least a portion of feed conduit 110 is maintained at an elevation above reactor vessel 102, and another portion of feed conduit 110 extends into the interior of reactor vessel 102. A flow distributor 107 is coupled to an end of feed conduit 110 and is positioned at the bottom end portion of reactor vessel 102. A plurality of nozzles or other outlets 109 are positioned on the exterior surface of flow distributor 107 and are configured to distribute the influent into the bottom end portion of reactor vessel 102. A backflow prevention system 101, comprising a check valve 104, an air release valve 106, and a vacuum relief valve 108, is provided to substantially limit backflow of fluid and media particles 103 through nozzles 109.

In the absence of backflow prevention system 101, and in the event of a power interruption or power loss, fluidization pump 112 ceases to deliver the influent into reactor vessel 102. Consequently, fluidized media particles 103 within reactor vessel 102 defluidize, descend to the base of reactor vessel 102 and settle in a quiescent state around flow distributor 107. When the level of defluidizing media particles 103 reaches the elevation of nozzles 109, the pressure of the defluidizing media particles 103 is great enough to urge media particles 103 into nozzles 109 of flow distributor 107. Consequently, media particles 103 become permanently or temporarily lodged in nozzles 109. Upon restart of fluidization pump 112, the obstructed nozzles 109 are prevented from delivering influent into the interior of reactor vessel 102. Consequently, the motive influent circumvents the obstructed nozzles and surges through the remaining unobstructed nozzles at a higher velocity. The arrangement of obstructed and unobstructed nozzles contributes to a non-uniform flow distribution throughout reactor vessel 102, the draw backs of which were previously described in the background section. Accordingly, and for the foregoing reasons, it is advantageous to employ a backflow prevention system, such as backflow prevention system 101 illustrated in FIGS. 3 through 6.

Referring to FIG. 3, a block diagram illustrating an embodiment of a backflow prevention system designated by the numeral "101" for use with fluidized bed reactor 100 is shown. Backflow prevention system 101 comprises the combination of check valve 104, air release valve 106, and vacuum relief valve 108. Feed conduit 110 delivers influent into an open top reactor vessel 102, which is exposed to atmospheric air. Check valve 104 is coupled to feed conduit 110 to effect unidirectional flow of the influent through feed conduit 110. In other words, check valve 104 permits influent flow into reactor vessel 102 and restricts influent flow from reactor vessel 102 in a reverse direction.

In the event of pump shutdown (pump not shown in FIG. 3), the flow of influent within feed conduit segment 113 (internal to the reactor vessel 102) seeks to descend into reactor vessel 102. However, a vacuum develops in the segment of the feed conduit 110 positioned above the reactor vessel fluid level 124, thereby restricting the influent from flowing through conduit segment 113 toward the flow distributor 107. In other words, the vacuum restricts the influent in conduit segment 113 from seeking its own level, hence, the influent level in conduit 113 resides above fluid level 124.

In response to the vacuum condition, vacuum relief valve 108 opens to introduce atmospheric air into feed conduit 110 to relieve or "break" the vacuum condition. By virtue of the vacuum relief valve action and the open state of reactor vessel 102 (i.e. vessel 102 is exposed to atmospheric air), the influent within conduit segment 113 is permitted to descend into reactor vessel 102 toward the flow distributor 107. In other words, in the absence of vacuum the influent in conduit segment 113 seeks its own level, i.e. a level equal to fluid level 124. As the vacuum is relieved, water in the conduit segment 113 flows towards and through nozzles 109 thus preventing backflow of media 103 into the nozzles 109 and the flow distributor 107.

The atmospheric air introduced into feed conduit 110 forms an air gap in the segment of feed conduit 110 positioned above fluid level 124. The air gap limits the influent within the reactor vessel 102 from backflow into feed conduit segment 113 through a plurality of nozzles (not shown). Upon reactivation of the pump, the air gap within feed conduit 110 is pressurized by the pumping action. The pressurized air is forced to the highest point in the system towards air release valve 106. Air release valve 106 opens to expel the pressurized air gap into the atmosphere. Thereafter the influent resumes its forward flow through the conduits and into reactor vessel 102. The influent ultimately buoys to the top end of reactor vessel 102 in the form of a treated effluent and is transported from reactor vessel 102 through outlet conduit 120.

For the purposes of comparison, the prior art backflow prevention systems illustrated in FIGS. 1 and 2 include an electrical and pneumatic source, respectively, to prevent or limit backflow in a fluidized bed reactor system. Specifically, the prior art backflow prevention system disclosed in U.S. Pat. No. 5,766,491 and illustrated in FIG. 1 includes a pump 82 powered by a rechargeable battery 84 to deliver auxiliary fluid from auxiliary tank 92 in the event of a power interruption. Another backflow prevention system illustrated in FIG. 2 and also disclosed in the '491 patent includes pressurized air source 128 to pressurize auxiliary tank 102 for the delivery of auxiliary fluid from auxiliary tank 102. Both of the prior art embodiments include shutdown interlock assembly 94, 142 which comprises a solenoid actuated fail-open valve 68 coupled to the auxiliary fluid flow conduit and a solenoid actuated fail-close valve 70 coupled to the primary fluid flow conduit. Fail-open valve 68 and fail-close valve 70 are electrically interlocked and operate in response to a signal generated by power loss indicator 72 that detects power loss to a motor used to drive pump 36. Solenoid actuated valves 68, 70 open and close to permit or inhibit flow of influent or auxiliary fluid as necessary.

Alternatively, fluidized bed reactor systems 100, 200, 300 do not require an electrical or pneumatic source, control air, electrical wiring and/or control electronics to operate backflow prevention system 101. It has been discovered that backflow prevention system 101 eliminates the need for an electrical and/or pneumatic power source. Valves 104, 106 and 108 are passive components, i.e. not controlled by a power source. The backflow prevention system 101 of the exemplary embodiments operates primarily or solely on the principles of fluid mechanics, which is an advantage over the existing fluidized bed reactor back flow prevention systems. The optional exclusion of an electrical and/or pneumatic power source may represent a cost savings to the manufacturer as well as the end user in terms of the cost incurred to operate the equipment. Furthermore, the efficiency and dependability of a primarily or purely mechanical backflow prevention system may be greater than a system controlled by an electrical and/or pneumatic source.

Figure 4:
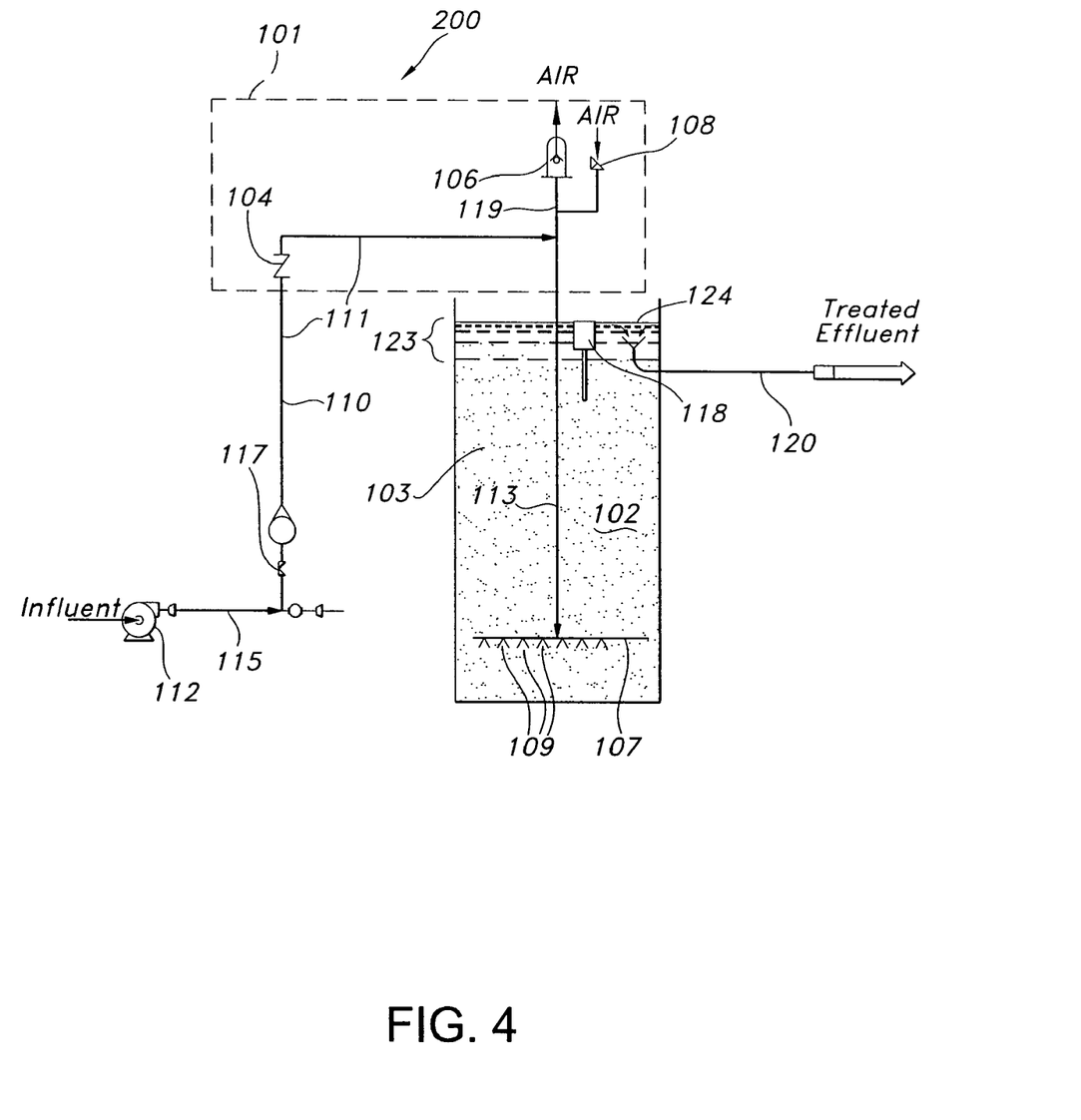
FIG. 4 is a schematic diagram of an embodiment of a biological fluidized bed reactor according to an aspect of this invention.

FIG. 4 is a schematic diagram of fluidized bed reactor 200. FIG. 4 illustrates a system including a fluidization pump 112, conduit segments 111 and 115, flow distributor 107, nozzles 109, and media particles 103. Generally speaking, reactor vessel 102 contains an aqueous suspension of biomass and media particles 103. Fluidization pump 112, external to reactor vessel 102, is configured to deliver influent (i.e. untreated wastewater) into reactor vessel 102 through conduit segments 111, 113, and 115 of feed conduit 110. More particularly, conduit segment 115 is coupled to the output end of fluidization pump 112 to receive the motive influent from pump 112. Conduit segment 111 is coupled to conduit 115 at a T-junction, where all or a portion of the motive fluid is directed through conduit segment 111. The flow rate and pressure of the motive influent through conduit segment 111 is controlled by manual flow control valve 117 positioned at the base of conduit segment 111.

Conduit segment 111 extends along the height of reactor vessel 102 to an elevation above reactor vessel 102 and more particularly to an elevation above fluid level 124. Two elbow segments positioned above the top end of the vessel redirect conduit segment 111 through the open top of vessel 102. Conduit segment 113 coupled to conduit segment 111 extends into the interior of vessel 102 from an elevation above the fluid level 124. Flow distributor 107 is coupled to the end of conduit segment 113 and positioned near or toward the bottom end of vessel 102. A plurality of nozzles 109 positioned along the exterior surface of flow distributor 107 are configured to deliver the motive influent into the bottom end portion of vessel 102 in a substantially uniform manner.

The influent expelled from flow distributor nozzles 109 commingles with the biomass coated media suspended in the aqueous solution. Under aerobic conditions, the biomass coated media degrades contaminants in the influent through enzymatic reaction to produce a treated effluent (i.e., treated waste water). Through the enzymatic reaction, media particle bed 103 grows and expands. As a result of the media particle bed growth, media particles 103 are subject to excessive buildup of biomass and precipitates, thereby causing compromised flow distribution, excessive media and/or biomass carryover, crusting, increased clogging of filters, and the like. Biomass separator system 118 positioned at the top of vessel 102 is configured to substantially reduce the buildup of biomass to protect fluidized bed reactor 200. The operation and structure of an exemplary biomass separator system 118 is comprehensively disclosed in U.S. patent application Ser. No. 10/877,338, filed Jun. 25, 2004, which is herein incorporated by reference in its entirety. The treated effluent forms effluent head 123 above media particle bed 103. The treated effluent is withdrawn from reactor vessel 102 through outlet conduit 120 positioned at the top end portion of reactor vessel 102.

Fluidized bed reactor 200 of this exemplary embodiment further comprises backflow prevention system 101 employed to substantially limit the backflow of fluid and media particles 103. Several examples of variables that prompt backflow in a fluidized bed reactor in the event of a power interruption include, but are not limited to, the weight and volume of the media particles, position of the influent feed conduit within the reactor vessel, elevation of the influent source (i.e. influent origin, such as a sewer) and existence of gas pockets in the influent feed conduit.

More specifically, the weight and volume of the media particles affect the inducement of the media particles to backflow through the nozzles in the event of a power interruption. The defluidized media particles form a media bed on the base of the reactor vessel as the fluidized media particles defluidize and descend to the base of the reactor vessel and collect around the flow distributor nozzles. The tremendous pressure generated by the developing media bed, which can weigh over 40,000 pounds, can urge the media particles through the nozzles of the flow distributor and into the inlet conduit.

Figure 5:
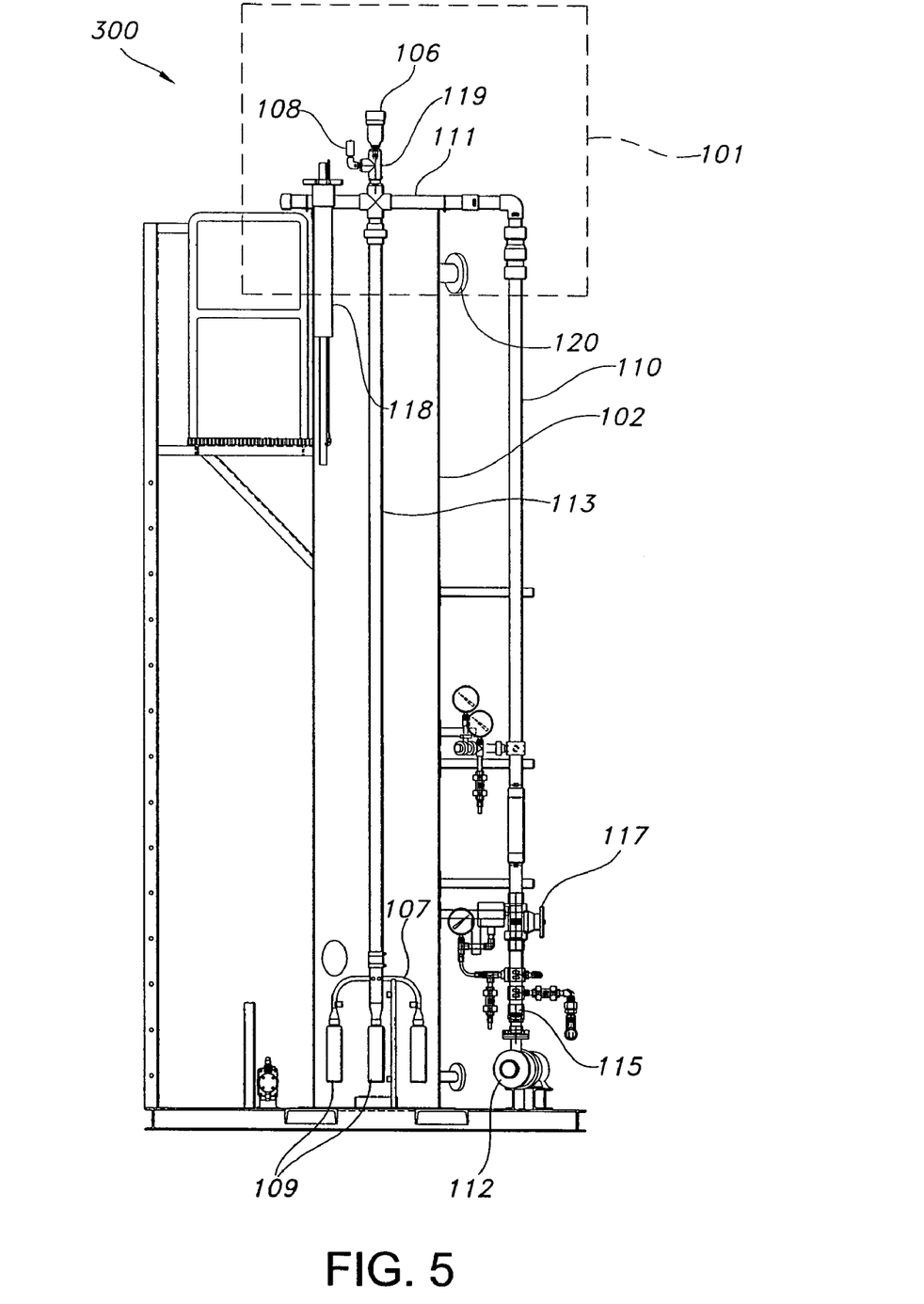
FIG. 5 is a cross-sectional side view of an embodiment of a biological fluidized bed reactor according to an aspect of this invention.

The position of the inlet conduit relative to the level of fluid within the reactor vessel also influences the backflow of fluid through the reactor system in the event of a power interruption. For example, if the inlet conduit enters the interior of the reactor vessel from an elevation below the level of fluid within the reactor vessel, as in the systems illustrated in FIGS. 1 and 2, the fluid in the reactor vessel maintained above the inlet conduit may drain into the inlet conduit by virtue of gravity. Conversely, if the inlet conduit enters the interior of the reactor vessel from an elevation above the level of fluid within the reactor vessel, as illustrated in FIGS. 3, 4 and 5, the fluid in the reactor vessel is generally restricted from backflow, barring any other conditions prompting backflow.

Furthermore, depending upon the elevation of the upstream influent origin relative to the elevation of the reactor vessel and in the event of a power interruption, the fluid in the reactor vessel may backflow into the inlet conduit due to a siphon effect. For example, if the influent origin (i.e. source) is maintained at a lower elevation than the reactor vessel, a siphon will transport the fluid in the reactor vessel to the influent origin in the event of a power interruption. Lastly, gas pockets formed in the inlet conduit may also create a backflow condition as the gas pockets rupture. The resulting free volume in the inlet conduit previously occupied by the gas pocket is replaced with fluid delivered from the reactor vessel, i.e. inducing a backflow condition.

Still referring to FIG. 4, backflow prevention system 101 comprises the combination of check valve 104, air release valve 106, and vacuum relief valve 108. Check valve 104 is positioned at the top end conduit segment 111. Air release valve 106 and vacuum relief valve 108 are coupled to conduit 119 which is coupled to conduit segment 119. The portion of feed conduit segment 110 that extends to an elevation above reactor vessel fluid level 124 facilitates the operation of backflow prevention system 101.

Following an interruption of influent flow a vacuum develops in the segment of feed conduit 110 positioned above fluid level 124. The vacuum in feed conduit 110 urges the vacuum relief valve 108 to an open position. Atmospheric air is directed through the open vacuum relief valve 108 and into feed conduit 110. Subsequent to the introduction of atmospheric air into feed conduit 110, an air gap develops in the segment of feed conduit 110 positioned above fluid level 124. The air gap substantially limits backflow of media particles 103 positioned at the bottom end of reactor vessel 102. Vacuum relief valve 108 thereby facilitates both vacuum relief and air gap formation in the segment of feed conduit 110 positioned above fluid level 124. A suitable vacuum relief valve 108 is currently sold and distributed by Plast-O-Matic Valves, Incorporated of Cedar Grove, N.J., USA.

Check valve 104 is utilized along with vacuum relief valve 108 to further limit the backflow of fluid and media particles 103 in the fluidized bed reactor 200. Check valve 104 permits the motive influent to flow in the downstream direction, i.e. towards vessel 102, and inhibits the motive influent from flowing in the upstream direction, i.e. towards fluidization pump 112. Furthermore, check valve 104 is coupled to the feed conduit 110 and positioned at or near the top end of conduit segment 111. Following shutdown of fluidization pump 112, the influent (in solid and/or liquid form) deposits on top of check valve 104. The weight of the deposited influent matter opposes check valve 104 from opening upon reactivation of fluidization pump 112. Accordingly, to limit the volume of influent matter residing on top of check valve 104, check valve 104 is optionally positioned at the top end portion of conduit segment 111, as illustrated in FIG. 4. A suitable check valve 104 is currently sold and distributed by ASAHI AMERICA Corporation of Malden, Mass., USA.

Air release valve 106 is utilized both after fluidization pump 112 reactivates and under normal operating conditions to expel pressurized gas from the system. Following the reactivation of fluidization pump 112, the atmospheric air previously delivered into the system through vacuum relief valve 108 is expelled through air release valve 106, as the air gap is no longer required to prevent backflow. Similar to vacuum relief valve 108, valve 106 facilitates the equalization of pressure within the feed conduit. It should be understood that although air release valve 106 is incorporated with backflow prevention system 101, air release valve 106 does not by itself limit or prevent backflow. Alternatively, air release valve 106 is utilized upon restart of fluidization pump 112 to expel the air gap employed to limit backflow. A suitable air release valve 106 is currently sold and distributed by Armstrong Corporation of Three Rivers, Mich., USA.

For backflow prevention system 101 to substantially limit backflow, a portion of conduit segment 111 is desirably elevated above fluid level 124 to facilitate a vacuum condition in the event of a power interruption. A vacuum relief valve is configured to introduce air into a conduit if a vacuum condition exists in that conduit. In this exemplary embodiment, the section of the conduit segment 111 elevated above fluid level 124 facilitates the vacuum condition. Conversely, if conduit segment 111 extended to an elevation below fluid level 124, backflow prevention system 101 of this exemplary embodiment would be compromised in its ability to limit backflow because a vacuum and subsequent resultant air gap would not tend to develop in a feed conduit positioned below fluid level 124.

In addition to limiting backflow, backflow prevention system 101 flushes the bottom end of reactor vessel 102. More specifically, in the event of a power interruption, vacuum control valve 108 opens and the influent descends through flow distributor nozzles 109 and "flushes" into the bottom end of reactor vessel 102. The flushing action inhibits the defluidized media particles 103 from backflow through flow distributor nozzles 109. The flushing action is especially advantageous in applications where gas may be produced as a bioreaction byproduct, such as in a denitrification process. Denitrification occurs when oxygen levels are depleted and nitrate becomes the primary oxygen source for biomass. The biomass break apart nitrate ($NO_3^-$) to gain oxygen ($O_2$) and the nitrate is consequently reduced to nitrous oxide ($N_2O$) and nitrogen gas ($N_2$). Since nitrogen gas has low water solubility, it tends to escape as gas bubbles. These gas bubbles can become bound in the settled media bed and cause the media bed particles to rise in reactor vessel 102, and, more importantly, rise into nozzles 109. The flushing action inhibits the media bed particles 103 from entering the flow distributor nozzles 109.

FIG. 5 is a partial cross-sectional front view of an embodiment of a fluidized bed reactor designated by the numeral "300". FIG. 5 illustrates the physical structure of fluidized bed reactor 300. A cross-section of reactor vessel 102 illustrates conduit portion 113, flow distributor 107, and nozzles 109 within reactor vessel 102. As described previously, fluidization pump 112 delivers influent through feed conduit 110 (comprising conduit segments 111, 115, 113). Conduit segment 113 extends into reactor vessel 102 and terminates at flow distributor 107. The influent is distributed through a plurality of nozzles 109 positioned on the exterior surface of flow distributor 107. Backflow prevention system 101 comprises check valve 104, air release valve 106, and vacuum relief valve 108, and conduit segment 111 extends to an elevation above reactor vessel 102 (and therefore above the reactor vessel fluid level).

Figure 6:
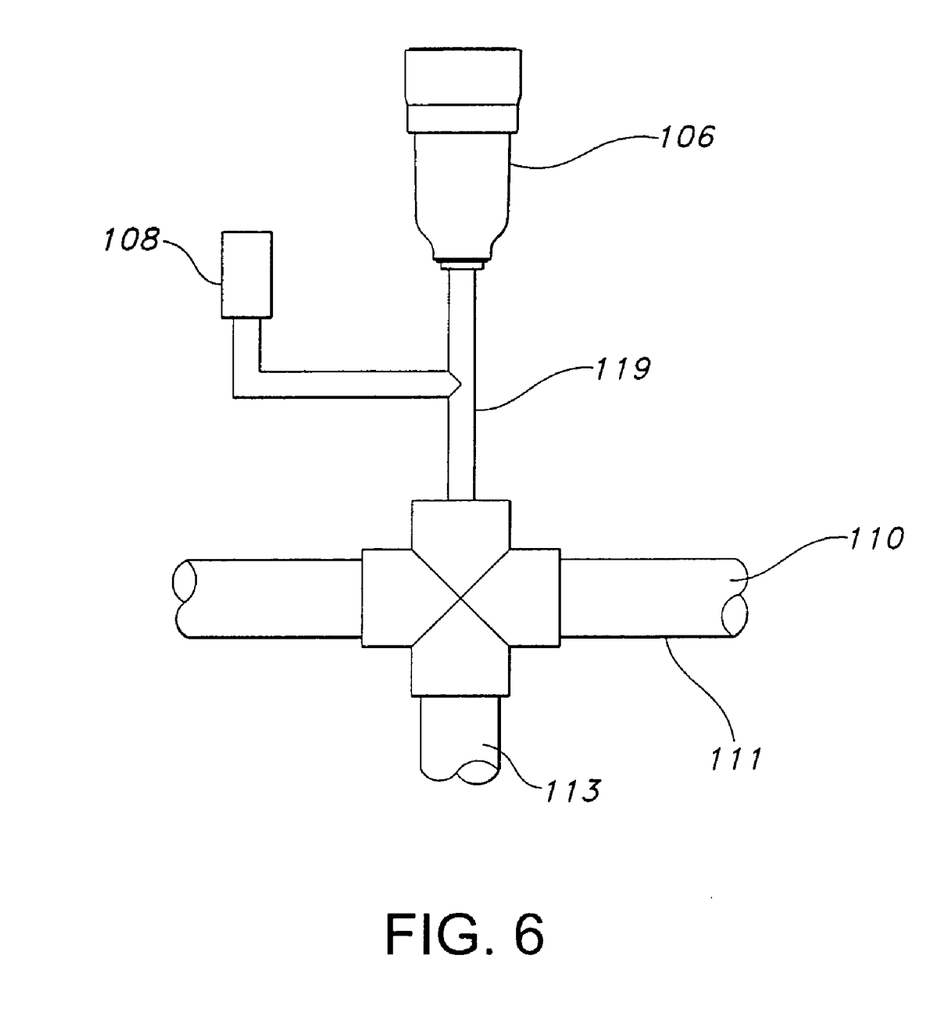
FIG. 6 is a detailed view of embodiments of air release and vacuum control valves configured for use in the biological fluidized bed reactor illustrated in FIG. 5.

FIG. 6 illustrates a detailed view of the air release valve 106 and the vacuum relief valve 108 shown in FIG. 5. Air release valve 106 and vacuum relief valve 108 are coupled to conduit 119. A cross-junction joins conduit segment 111, conduit 119, and conduit segment 113.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention. Also, the embodiments selected for illustration in the figures are not shown to scale and are not limited to the proportions shown. The relative arrangement and position of the fluidized bed reactor components are not limited to arrangement illustrated in the figures.

What is claimed:

1. A fluidized bed reactor configured for reduced backflow of fluid comprising:
    a vessel configured to contain a level of fluid;
    a feed conduit positioned to deliver feed into said vessel from an elevation above said level of fluid; and
    a vacuum relief valve coupled to said feed conduit to introduce gas into said feed conduit.

2. The fluidized bed reactor of claim 1 further comprising a check valve coupled to said feed conduit to limit backflow of fluid in said feed conduit.

3. The fluidized bed reactor of claim 2, wherein said check valve is coupled to said feed conduit at an elevation above said level of fluid.

4. The fluidized bed reactor of claim 1 further comprising an air release valve coupled to said feed conduit to exhaust gas from said feed conduit.

5. The fluidized bed reactor of claim 1, wherein said vacuum relief valve is coupled to said feed conduit to introduce gas into said feed conduit and substantially prevent backflow of fluid in said feed conduit.

6. The fluidized bed reactor of claim 1, wherein said level of fluid in said vessel is exposed to an atmospheric pressure.

7. The fluidized bed reactor of claim 1, wherein said fluidized bed reactor is configured to limit the migration of said, media particles into said feed conduit.

8. The fluidized bed reactor of claim 1 further comprising a pump coupled to said feed conduit configured to deliver influent through said feed conduit into said vessel.

9. The fluidized bed reactor of claim 1, wherein said feed conduit extends into said vessel from an elevation above said level of fluid.

10. A fluidized bed reactor for reduced backflow of fluid comprising:
    means for containing a level of fluid;
    means for delivering feed into said containing means from an elevation above said level of fluid; and
    means for reducing vacuum in said feed conduit.

11. The fluidized bed reactor of claim 10, wherein said vacuum reducing means comprises a vacuum relief valve.

12. The fluidized bed reactor of claim 10, wherein said containing means comprises a vessel.

13. The fluidized bed reactor of claim 10, wherein said feed delivering means comprises a feed conduit positioned to deliver feed into said containing means.

14. The fluidized bed reactor of claim 10 further comprising means for limiting reverse flow of fluid in said feed delivering means.

15. The fluidized bed reactor of claim 14, wherein said reverse flow limiting means comprises a check valve coupled to said delivering means.

16. The fluidized bed reactor of claim 10 further comprising means for releasing air from said feed delivering means.

17. The fluidized bed reactor of claim 16, wherein said air releasing means comprises an air release valve coupled to exhaust gas from said feed delivering means.

18. In a fluidized bed reactor having a pump configured to deliver fluid into a vessel through a feed conduit, a method of, reducing the backflow of fluid following shutdown of the pump comprising the step of:
    introducing gas into a portion of the feed conduit that is positioned at an elevation above a level of fluid contained in the vessel, thereby reducing vacuum in the feed conduit and reducing backflow of the fluid.

19. The method of claim 18, wherein the step of introducing gas into the feed conduit prevents backflow of the fluid.

20. The method of claim 18 further comprising the step of de-activating the pump, thereby forming a vacuum in a portion of the feed conduit.

21. The method of claim 18 further comprising the step of expelling gas from the feed conduit through an air release valve, following reactivation of the pump.

22. The method of claim 18 further comprising the step of reducing backflow of fluid with a check valve coupled to the feed conduit.

23. The method of claim 18, wherein the step of introducing gas into the feed conduit comprises introducing gas into the feed conduit through a vacuum relief valve coupled to the feed conduit.

24. In a fluidized bed reactor having a vessel configured to contain a level of fluid and a pump connected to deliver feed to said vessel, a system for reducing the backflow of fluid comprising:

a feed conduit extending between said pump and said vessel, at least a portion of said feed conduit being positioned at an elevation above said level of fluid in said vessel; and a vacuum relief valve coupled to said feed conduit to introduce gas into said feed conduit.

25. The system of claim 24 further comprising a check valve coupled to said feed conduit to limit backflow of fluid in said feed conduit.

26. The system of claim 24 further comprising an air release valve coupled to said feed conduit to exhaust gas from said feed conduit.

27. The system of claim 24, wherein said level of fluid in said vessel is exposed to an atmospheric pressure.

28. In a fluidized bed reactor having a vessel configured to contain a level of fluid and a pump connected to deliver feed to the vessel, a method of configuring the fluidized bed reactor for reduced backflow of the fluid comprising the step of:

connecting a feed conduit between the pump and the vessel such that at least a portion of the feed conduit is positioned at an elevation above the level of fluid in the vessel; and coupling a vacuum relief valve to introduce gas into the feed conduit, thereby facilitating the reduction of vacuum in the feed conduit and the associated backflow of the fluid.

29. The method of claim 28 further comprising the step of coupling an air release valve to the feed conduit to expel the gas from the feed conduit.

30. The method of claim 28 further comprising the step of coupling a check valve to the feed conduit to reduce backflow of fluid though the feed conduit.

31. In a fluidized bed reactor having a vessel configured to contain a level of fluid and a feed conduit for delivering feed to the vessel, a method of configuring the fluidized bed reactor for reduced backflow of the fluid comprising the steps of:

positioning at least a portion of the feed conduit at an elevation above the level of fluid within the vessel;

extending the feed conduit into the interior of the vessel; and coupling a vacuum relief valve to introduce gas into the feed conduit.

* * * * *